UNITED STATES PATENT OFFICE.

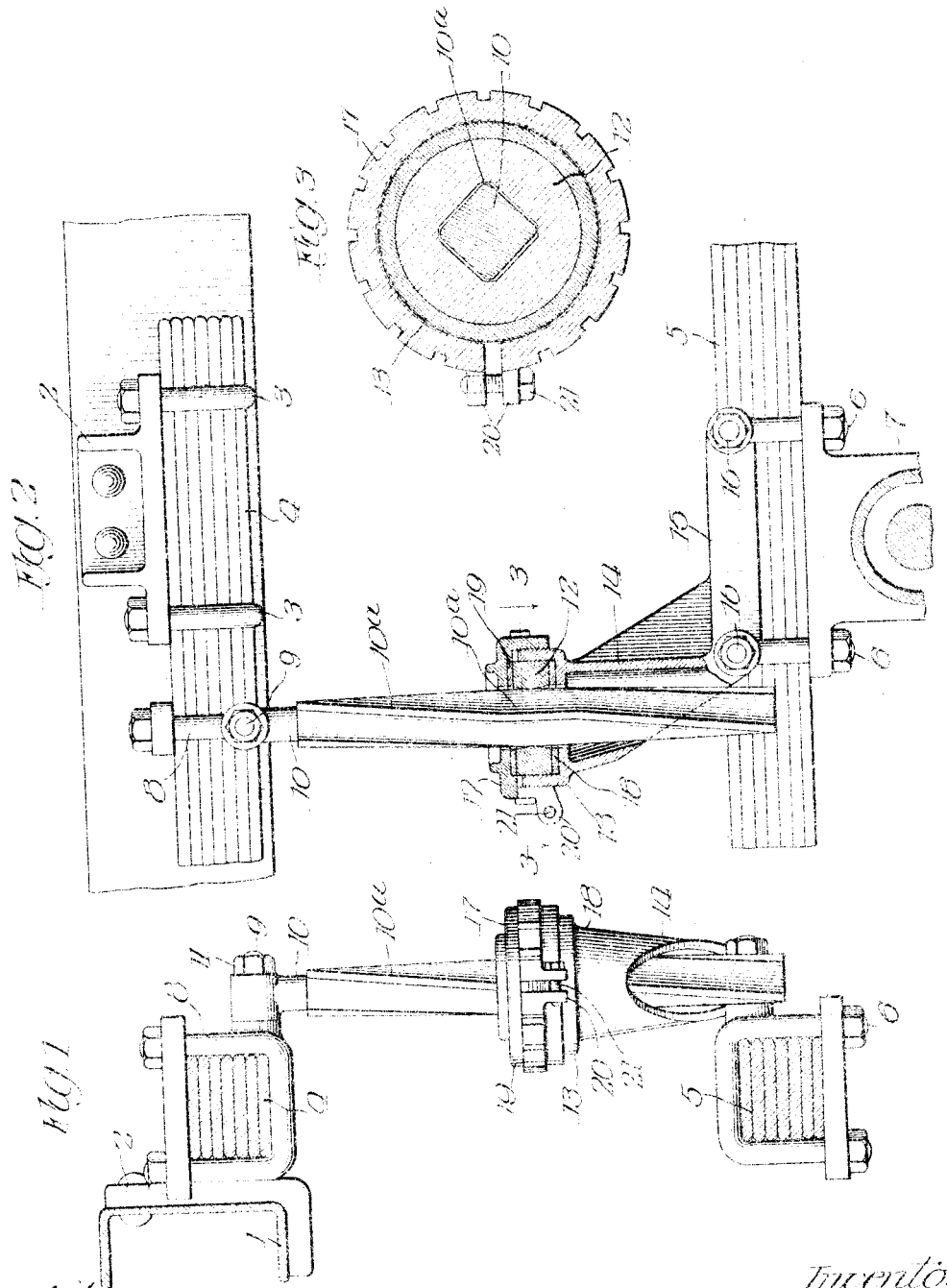

WILLIAM J. CASEY, OF CHICAGO, ILLINOIS.

SHOCK-ABSORBER.

1,135,659.   Specification of Letters Patent.   Patented Apr. 13, 1915.

Application filed November 27, 1914. Serial No. 874,130.

*To all whom it may concern:*

Be it known that I, WILLIAM J. CASEY, a citizen of the United States, residing at Chicago, Cook county, Illinois, have invented certain new and useful Improvements in Shock-Absorbers, of which the following is a specification.

My invention relates to shock absorbers intended more particularly but not necessarily for automobiles and the object thereof is to provide a simple and efficient device of this character.

The various features of advantage and utility will be apparent from the description hereinafter given.

In the drawing Figure 1 is an end elevation of my shock absorber showing the springs of an automobile and also the frame in section; Fig. 2 a side elevation thereof showing a portion of the shock absorber in cross section and Fig. 3 a horizontal section on the line 3—3 of Fig. 2.

It will be understood that owing to differences in the construction of different automobiles changes are necessary in the details of the embodiment of my invention, particularly the manner of attachment to the spring members or to a spring member and a part of the frame in order to accommodate the situations presented. It will also be understood that my invention may be used in connection with different types of spring suspension as for instance the semi-elliptic, the three-quarter elliptic and the full elliptic. In the present instance the embodiment may be considered as one applicable to either the three-quarter elliptic or the full elliptic spring suspension.

Referring to the embodiment of my invention as herein shown, the frame of the automobile is illustrated at 1 and provided with a suitable bracket 2 having proper spring clips 3 for engaging and holding the upper spring member 4. The lower spring member 5 is secured by means of the clips 6 to the running gear or axle 7. My shock absorber is located between the two members of the spring at or toward the middle portion thereof.

The upper spring member 4 is provided with an additional spring clip 8 having a laterally extending stud 9 on which is mounted a depending shaft or plunger 10 capable of slight oscillating movement on the stud 9. This plunger is held in place by means of the nut 11 screwing into the outer end of the stud 9. This plunger is of angular formation, the same being in the present instance substantially of square formation but given helical formation as to its end portions preferably by twisting. Only the end portions are thus twisted or otherwise made so as to produce this spiral or helical formation, the central or intermediate portion indicated at 10$^b$ retaining its substantially straight formation.

In the particular embodiment shown in the drawing, the shaft or plunger 10 constitutes the upper one of two members, the lower member being a frictionally held nut 12 although it will be understood that the said relative position of the members may be reversed.

As shown, the nut 12 is provided with a central bore having the same form as the cross section of the plunger. The nut is mounted within a casing 13 formed at the upper end of a bracket 14 which is anchored in any suitable manner to the lower member of the springs or the mountings thereof. In the present instance this bracket has a lateral extension 15 secured by means of the studs 16 to the spring clips 6. The casing 13 has secured thereto a cap 17 whose purpose is to regulate the frictional resistance of the nut 12 whose top and bottom faces bear directly against the two washers 18 and 19 made of fiber or other suitable material. The washer 18 is interposed between the lower face of the nut and the bottom of the casing while the upper washer 19 is interposed between such nut and the inner face of the cap 17. It will be understood that by screwing the cap 17 downwardly the frictional resistance is increased and by screwing such cap upwardly the resistance is lessened. The cap is adapted to be locked in any position and for this purpose such cap is in the form of a split ring with two parallel lugs 20 which are clamped together by means of the clamping bolt 21. After the proper adjustment is obtained the cap is locked in position by means of this bolt.

The normal position of the parts is shown in the drawings according to which the nut occupies a substantially middle portion of the plunger which is the straight portion. This straight portion is of such length that ordinary or rather light shocks or spring movements are taken care of by the springs themselves, it being understood that the nut is adapted to move freely downwardly and upwardly with respect to the plunger, that is without any oscillation or rotation of the nut and consequently without any resistance from the shock absorber. However, in case of a considerable movement of either spring member upwardly or downwardly, the spiral formation of the plunger will be presented to the nut and the nut will be caused to turn and such turning will be resisted by reason of the washers 18 and 19 and the shocks will thereby be absorbed and too great extremes of movements will be prevented.

I claim:

1. A shock absorber comprising a shaft or plunger of spiral formation at its end portions and of straight formation at its middle portion, and a frictionally held member through which such plunger works.

2. A shock absorber comprising a shaft or plunger angular in cross section and having its ends helically twisted and its middle portion straight, and a frictionally held member through which such plunger works.

3. A shock absorber comprising a shaft or plunger of spiral formation at its end portions and of straight formation at its middle portion, a casing, a nut which is frictionally held in the casing and through which the plunger works, and means in the casing for imparting frictional resistance to the nut.

4. A shock absorber comprising a shaft or plunger of spiral formation at its end portions and of straight formation at its middle portion, a casing, a nut which is frictionally held in the casing and through which the plunger works, and means in the casing for imparting frictional resistance to the nut consisting of washers on opposite sides of the nut.

5. A shock absorber comprising a shaft or plunger of spiral formation at its end portions and of straight formation at its middle portion, a casing, a nut which is arranged within the casing and through which the plunger works, and means on the casing for regulating the degree of frictional resistance of the nut.

6. A shock absorber comprising a shaft or plunger of spiral formation at its end portions and of straight formation at its middle portion, a casing, a nut which is arranged within the casing and through which the plunger works, and means on the casing for regulating the degree of frictional resistance of the nut consisting of a cap screwing onto the casing and clamping the nut therewithin.

7. A shock absorber comprising a shaft or plunger of spiral formation at its end portions and of straight formation at its middle portion, a casing, a nut which is arranged within the casing and through which the plunger works, and means on the casing for regulating the degree of frictional resistance of the nut consisting of a split ring cap screwing onto the casing and adapted to impart frictional resistance to the nut within, and a clamping bolt for the cap.

8. A shock absorber comprising a shaft or plunger of spiral formation at its end portions and of straight formation at its middle portion, and a frictionally held nut through which such plunger works, a casing, a nut which is arranged within the casing and through which the plunger works, friction washers in the casing and on opposite faces of the nut, and a cap on the casing for binding the nut and washers together with a frictional resistance.

WILLIAM J. CASEY.

Witnesses:
S. E. HIBBEN,
ROBERT DOBBERMAN.